No. 635,354. Patented Oct. 24, 1899.
H. SCHNEPP.
TIRE FOR CYCLES.
(Application filed Mar. 25, 1898.)
(No Model.)
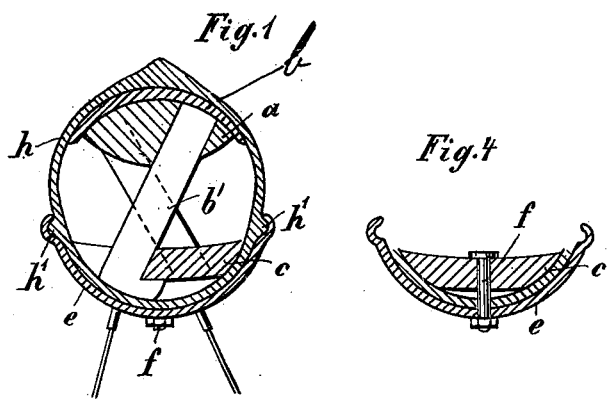
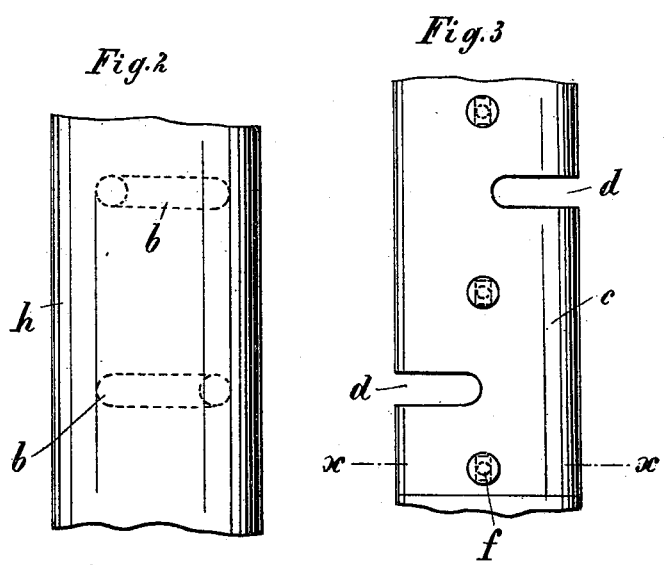
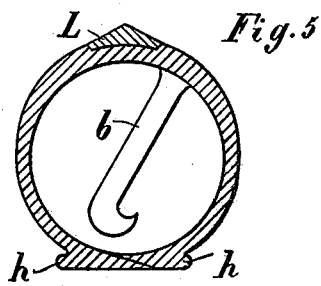
Witnesses
Inventor

UNITED STATES PATENT OFFICE.

HANS SCHNEPP, OF AUGSBURG, GERMANY.

TIRE FOR CYCLES.

SPECIFICATION forming part of Letters Patent No. 635,354, dated October 24, 1899.

Application filed March 25, 1898. Serial No. 675,170. (No model.)

*To all whom it may concern:*

Be it known that I, HANS SCHNEPP, residing at Augsburg, in the German Empire, have invented new and useful Improvements in Elastic Tires for the Wheels of Cycles and Similar Vehicles, of which the following is a specification.

This invention relates to that class of elastic tires in which two concentric fellies or rims are connected together for the purpose of obtaining a resilient tire, the purpose of the present invention being to render the construction of such tires more efficient, less expensive, and by inclosing them in an outer cover of canvas or elastic material to render the component parts dustproof and to protect them from injuries, as well as the outer cover, so that my improved elastic tire will be more durable than the usual pneumatic as well as elastic tires.

With these ends in view the invention consists in certain novel features of construction and combinations of parts hereinafter described and the essential elements of which are recited in the appended claims.

To render the following description of my invention more intelligible, the accompanying drawings illustrate, in—

Figure 1, a section through my improved tire fixed to the wheel-rim. Fig. 2 explains the arrangement of the rubber springs. Figs. 3 and 4 show in plan view and cross-section the internal hoop or ring, and Fig. 5 shows a somewhat modified form of carrying out my improved tire.

My improved elastic tire comprises the following parts: an inner felly or ring $c$, adjacent to the usual rim $e$ of the wheel and connected therewith by means of screws $f$ in the usual manner. This ring $e$ may consist of a number of sections, together forming the complete ring, and by arranging springs at the inner surface of the ring the tension between the rim $e$ and the ring $c$ may be regulated by screwing tight or loosening the screws $f$, as required. For this purpose it may be convenient to form the holes in the ring $c$ for the passage of the screws $f$ of an oblong shape. The side edges of the ring $c$ are alternately provided with notches $d$, as will be explained more fully later on. Concentric to the inner ring $c$ an outer ring $a$ is provided in the usual way, the sectional form of which is approximately lenticular, and which ring consists of wood or other suitable substance, such as aluminium, celluloid, papier-mâché, or the like. The ring $a$ is provided with holes, which are placed obliquely toward each other. These holes serve for the reception or passage, respectively, of the connecting means between the two rings $a$ and $c$. These connecting means, which render the tire as a whole elastic, consist of an annular band $b$, having hook-shaped projections $b'$ pointing inward alternately and obliquely in accordance with the holes in the outer concentric ring $a$, through which they are adapted to pass.

The band $b$, with its projecting hooks $b'$, is preferably made of best Para rubber and may be made in sections, so as to build up a ring for covering the entire outer surface of the outer concentric ring $a$. The width of the band $b$ is somewhat larger than the width of the ring $a$, so that it slightly overlaps at either side thereof for the purpose of preventing the outer cover of the tire from being damaged.

I may construct the band $b$ so as to form the outer cover of the tire, as shown in Fig. 5, the hooks $b'$ projecting inwardly from the tread portion. The several sections of such an outer tire may be connected by a special tread $l$ or be clamped to the rim of the wheel between the rim and the inner concentric ring $c$ by means of the fastening-screws $f$. I, however, find it preferable to inclose the component parts of my improved elastic tire in a special outer tire $h$, which is suitably secured to the wheel-rim $e$ by means of annular ridges $h'$, which fit into corresponding grooves in the rim $e$. The inner concentric ring $c$, in connection with the rim $e$ and the fastening-screws $f$, may likewise serve for securing the two side edges of the outer cover $h$ in position in the usual manner, so that the ridges $h'$ and grooves in the rim may be dispensed with.

My improved elastic tire is put together and thus rendered fit for use in the following way: After placing the band $b$ over the outer ring $a$ and passing the hooks $b'$ through the respective holes therein the lower ends of said hooks are put into the lateral notches in the inner ring c in such a manner that the nose of the hook fits under the ring c. The outer cover h is now placed around the band b and ring c, the lower ends of the screws f projecting outward, and thereupon the tire, which is now complete, placed on the rim e, so that the lower ends of the screws f project through the holes in the rim e provided for same in the latter. By screwing a screw-nut onto the screws f the tire may be reliably secured in position.

When weight is placed on a wheel fitted with my improved tire, the hooks b' render the tire elastic, as usual, simultaneously. The tire cannot move out of position sidewise, as when riding around a curve, owing to these hooks b' being placed crosswise.

My improved elastic tire is further distinguished by being applicable to the usual cycles without necessitating great altering of the wheel, and the old tire-cover may even be used.

When the band b is constructed so as to form the outer cover, its lateral edges are secured to the rim e in the usual well-known manner after the outer and inner concentric rings a and c and the hooks b' have been previously placed in position.

I claim as my invention—

1. In an elastic tire essentially composed of two concentric rings in connection with the ordinary rim, the combination of an india-rubber band b having hooks formed alternately on the under side and arranged obliquely toward each other, said hooks of india-rubber adapted to pass through oblique holes in the outer concentric ring a and engage notches laterally provided in the inner concentric ring c so that the nose of the hook bears on the lower surface of said ring c, the two concentric rings with band and hooks being inclosed in an outer cover h and secured to the usual rim e by means of screws f with screw-nuts penetrating the rim e and inner concentric ring c, substantially as and for the purposes set forth.

2. In an elastic tire of the kind described an outer concentric ring a having alternately-oblique holes pointing toward each other, in combination with an inner concentric ring c having alternately-lateral notches in accordance with the oblique holes in the ring a; an elastic band b adapted to be placed over the outer concentric ring a so as to cover same and its hook-shaped extensions adapted to be passed through the oblique holes in the outer ring a and to engage the lateral notches in the inner ring c, substantially as and for the purpose set forth.

3. In an elastic tire of the kind described an elastic band b to be placed over the outer concentric ring a so as to cover same entirely, having integral therewith hook-shaped extensions obliquely pointing inward and toward each other, said hook-shaped extensions adapted to be passed through the corresponding oblique holes in the outer ring a and to engage lateral notches in the inner ring c, under which their noses grip, substantially as and for the purpose set forth.

4. In an elastic tire of the kind described the india-rubber band b, with oblique extensions pointing inward crosswise, of such a width so as to form the outer cover, the side edges of this band being gripped between the inner ring c and the rim e and secured in position by means of screw-bolts f, substantially as and for the purpose set forth.

In witness whereof I have hereunto set my hand in presence of two witnesses.

HANS SCHNEPP.

Witnesses:
F. OBERNDORF,
K. DREXLER.